Patented Nov. 2, 1926.

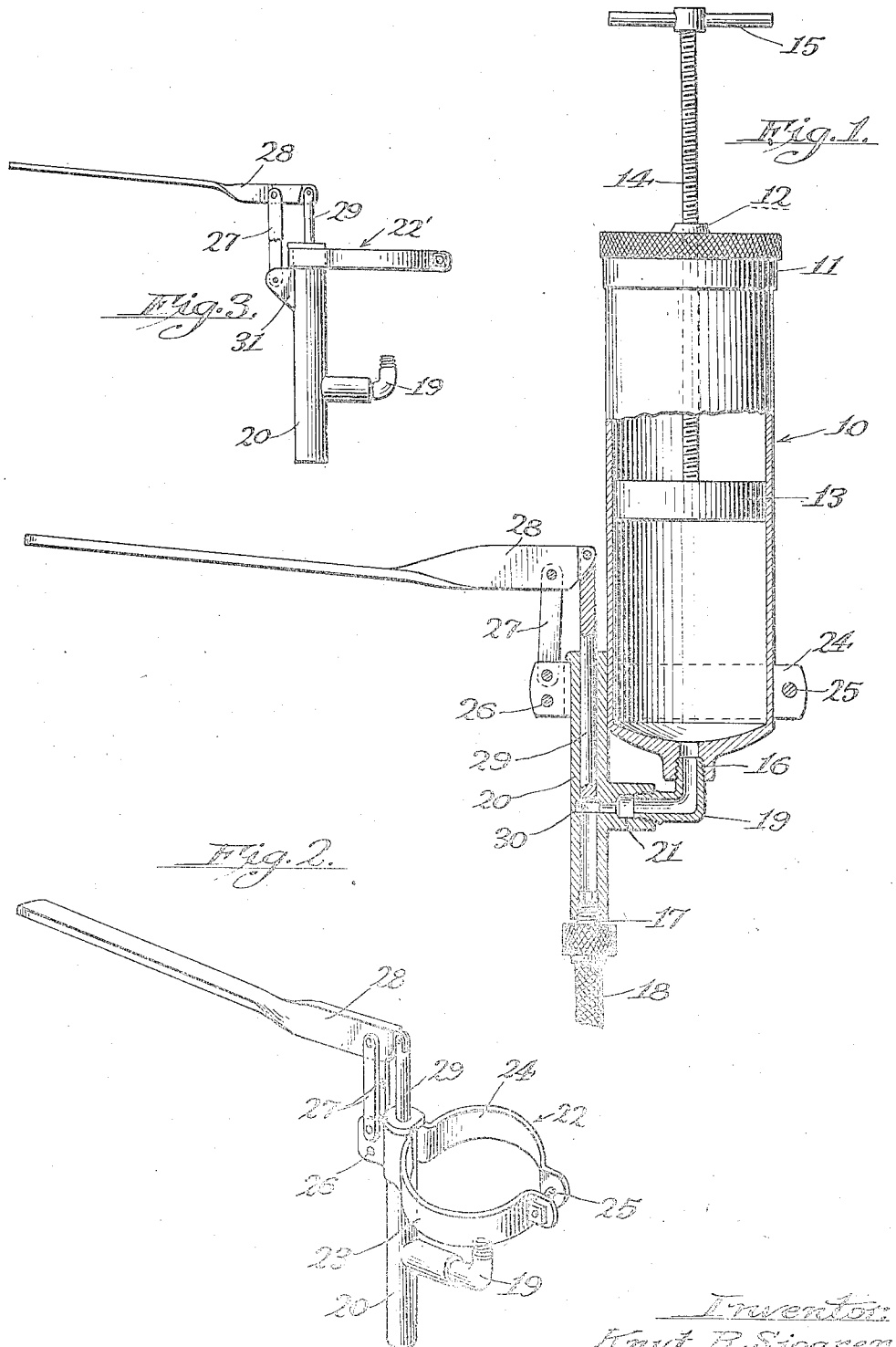

1,605,475

UNITED STATES PATENT OFFICE.

KNUT R. SJOGREN, OF LOS ANGELES, CALIFORNIA.

HIGH-PRESSURE ATTACHMENT FOR GREASE GUNS.

Application filed January 23, 1925. Serial No. 4,187.

This invention relates to improvements in attachments for grease guns.

It is an object of the invention to provide an attachment for grease guns which may materially increase the pressure under which the grease or other lubricating material may be forced in lubricating various parts of machines and the like. The attachment consists essentially of providing a barrel into which the grease is forced from the grease gun, which barrel is provided with a plunger operable by a lever which will easily and quickly force the grease from the barrel to the part to be lubricated under a much greater pressure than could be provided by the grease gun per se.

A further object of the invention is to provide a device which is easily and quickly attachable to grease guns of conventional construction, and which will materially increase the pressure under which the grease is forced to and about the part to be lubricated.

With the foregoing and other objects in view which will be made manifest in the following detailed description and pointed out in the appended claims, reference is had to the accompanying drawings for an illustrative embodiment of the invention, wherein:

Figure 1 is a vertical section showing the attachment as applied to a grease gun;

Fig. 2 is a perspective view of the attachment shown in Fig. 1; and

Fig. 3 is a side elevation of a slightly modified form of the attachment.

Referring to the accompanying drawings wherein similar reference characters designate similar parts throughout, the grease gun consists of a container 10 having a cap 11, in which there is provided a threaded aperture 12. A plunger 13 is reciprocable within the container 10 and is operated by a threaded plunger rod 14 extending through the aperture 12. The plunger rod 14 carries a suitable handle 15. In the bottom of the container 10 there is provided a threaded aperture 16, which, in the conventional type of grease gun, receives the coupling 17 of a flexible conduit or hose 18. In applying the attachment to the grease gun, the coupling 17 is removed from the threaded aperture 16 and an elbow 19 is inserted therein. A barrel 20 having a lateral opening 21 is threaded on to the elbow 19. A bracket, generally designated at 22, is secured about the container 10. This bracket consists of semi-circular parts 23 and 24, the opposed ends of these parts being connected together by means of a nut and bolt 25. The other ends of these parts 23 and 24 pass about the barrel 20 and are secured together as by a rivet 26. A pair of links 27 are pivoted to the ends of the parts 23 and 24 which are secured together by the rivets 26 and a lever 28 is pivoted between the upper ends of these links. A plunger 29 is pivoted to the end of the lever 28 and extends downwardly within the barrel 20. The plunger 29 is so arranged that when the lever 28 is in horizontal position, the plunger will be disposed just above the lateral opening 21 communicating with the barrel 20. The coupling 17 of the flexible conduit or hose 18 is threaded into the lower end of the barrel 20. A small annular groove 30 is formed in the barrel 20 opposite the lateral opening 21 for a purpose hereinafter to be described.

In the conventional type of grease gun, the grease is placed within the container 10 and forced therefrom through the aperture 16 into the flexible conduit or hose 18 by screwing down the plunger rod 14 and causing the plunger 13 to move downwardly within the container 10. Because of the fact that the cross sectional area of the container 10 is considerably greater than the cross sectional area of the aperture 16 through which the grease is forced, the pressure under which the grease is forced through the conduit 18 is necessarily limited. When the improved attachment is secured to the container, the grease is forced from the container 10 through the elbow 19 through the barrel 20 and into the conduit 18 by screwing down the plunger 13. When the part to be lubricated becomes partially filled with grease or the entrance to this part may become stopped up for any of a number of various reasons, the plunger 13 is screwed down as far as possible. The lever 28 is then lifted causing the plunger 29 to move downwardly within the barrel. The initial movement of the plunger 29 effectively seals off the lateral opening 21 and because of the leverage provided by the lever 28 and also because of the fact that the cross sectional area of the plunger 29 is not very much greater than the cross sectional area of the aperture in the coupling 17, the pressure under which the grease is forced into the conduit 18 is many times greater than the pressure which could be afforded by the grease gun alone. Because of the fact that the plunger 29 seals off the lateral opening 21, this increased pressure within the lower end of barrel 20 and the conduit 18 will not permit the grease to be forced back into the container 10. As the plunger 29 necessarily has only a working fit within the barrel 20, the increased pressure will tend to force the grease back within the barrel 20 between the plunger 29 and the interior wall of the barrel. If some grease tends to go up, it is caught in the annular groove 30 and will not pass upwardly around the plunger 29, so as to come out of the upper end of the barrel 20.

In the modified form shown in Fig. 3, the bracket 22′ may consist of a single piece of metal bent around the barrel and adapted to be clamped about the container 10. A lug 31 is formed integral with the barrel and the links 27 are pivoted to this lug, these links being also pivoted to the lever 28, as before.

By securing the barrel 20 against the side of the container 10, so that it will be substantially parallel with the container, the grease is discharged from the flexible conduit 18 in the same direction as it would be discharged if forced directly from the container 10. It follows from this construction that the arrangement of the barrel 20 upon the grease gun container 10 provides a very handy attachment, which is easily and quickly operated and is also very convenient, as distinguished from other awkward arrangements wherein the barrel 20 might be otherwise arranged.

It will be understood that various changes may be made in the detail of construction without departing from the spirit or scope of the invention as defined by the appended claims.

I claim:

1. A grease gun comprising a container adapted to hold grease, a plunger reciprocable within said container, a barrel secured against the side of said container and disposed substantially parallel with it, a plunger reciprocable in said barrel, a conduit communicating with said container and with said barrel intermediate its ends, and a groove formed in said barrel opposite said conduit as and for the purpose described.

2. A grease gun attachment comprising a barrel having a laterally extending nipple formed thereon intermediate its ends, an elbow mounted upon the nipple adapted to be connected to the container of the grease gun, a plunger reciprocable in one end of said barrel, there being an outlet in the other end of said barrel, and means for reciprocating said plunger comprising a lever having one end pivotally connected to the plunger, a link pivoted to the lever adjacent said end, and means for pivotally connecting said link to the barrel.

3. A grease gun attachment comprising a barrel having a laterally extending nipple formed thereon intermediate its ends, an elbow mounted upon the nipple adapted to be connected to the container of the grease gun, a plunger reciprocable in one end of said barrel, there being an outlet in the other end of said barrel, means for reciprocating said plunger comprising a lever having one end pivotally connected to the plunger, a link pivoted to the lever adjacent said end and means for pivotally connecting said link to the barrel, and means for fastening the barrel to the container of the grease gun.

4. A grease gun attachment comprising an open ended barrel having a laterally extending nipple intermediate its ends, an elbow connected to the nipple, a plunger reciprocable in said barrel, a bracket secured to the barrel providing means for attaching the barrel to a grease gun, a link pivoted to the bracket, and a lever pivoted to the link and to the plunger.

In testimony whereof I have signed my name to this specification.

KNUT R. SJOGREN.